(12) United States Patent
Yanagi

(10) Patent No.: US 7,985,909 B1
(45) Date of Patent: Jul. 26, 2011

(54) EASY METHOD AND SYSTEM FOR A MUSICAL KEYBOARD INSTRUMENT

(76) Inventor: Mayumi Yanagi, San Francisco, CA (US)

( * ) Notice: Subject to any disclaimer, the term of this patent is extended or adjusted under 35 U.S.C. 154(b) by 0 days.

(21) Appl. No.: 12/648,838

(22) Filed: Dec. 29, 2009

(51) Int. Cl.
*G09B 15/00* (2006.01)
(52) U.S. Cl. ...................................... 84/470 R
(58) Field of Classification Search ............. 84/470 R, 84/483.1, 483.2, 471 R, 477 R, 478, 479 R, 84/479 A
See application file for complete search history.

(56) References Cited

U.S. PATENT DOCUMENTS

2002/0117043 A1* 8/2002 Powley .................. 84/483.2

\* cited by examiner

Primary Examiner — Kimberly Lockett
(74) Attorney, Agent, or Firm — Kevin Roe

(57) ABSTRACT

A method and system to facilitate learning how to play a musical keyboard instrument. A first embodiment of the invention involves a system to facilitate learning, including a plurality of indicators on a plurality of keys on a keyboard of a musical keyboard instrument, wherein each key of the plurality of keys has at least one indicator of the plurality of indicators; and a plurality of matching indicators for placement on a plurality of fingers, wherein each finger of the plurality of fingers has one matching indicator of the plurality of matching indicators. A second embodiment of the invention involves a method to facilitate learning, including fabricating a plurality of indicators for attachment on a plurality of keys on a keyboard of a musical keyboard instrument, wherein each key of the plurality of keys has at least one indicator of the plurality of indicators; and providing a plurality of matching indicators corresponding to the plurality of keys, wherein the plurality of matching indicators are provided for placement on a plurality of fingers of a person, wherein each finger of the plurality of fingers has one matching indicator of the plurality of matching indicators that corresponds to a key of the plurality of keys.

20 Claims, 14 Drawing Sheets

EASY METHOD AND SYSTEM FOR A MUSICAL KEYBOARD INSTRUMENT

BACKGROUND OF THE INVENTION

Description of the Prior Art

Learning to play a musical keyboard instrument (e.g., piano, synthesizer, or an equivalent) is challenging. Many people give up after encountering difficulty in learning to read sheet music and/or after encountering difficulty in learning how to make each finger of each hand depress the correct key in sequence. Using conventional music instruction methods and systems, learning to play a musical keyboard instrument remains very difficult for most people, and many people give up their efforts to learn how to play the keyboard long before they reach the capability to play a large enough number of melodies to keep them motivated to continue their practice. An easily learned method and system to play music would help people play music much quicker and help motivate them to continue to learn more in order to play a wider variety of music.

SUMMARY OF THE INVENTION

The present invention provides a method and system for an individual to read musical notes by reading some indicators (e.g., color, alphanumerical characters, shaped symbols, or equivalent symbols) on a medium (e.g., paper, plastic, display screen, or an equivalent medium), in order to play a musical keyboard instrument. In one embodiment, a plurality of keys would also have the same indicators or corresponding indicators on their surfaces to guide an individual in depressing the correct keys in the correct sequence to play music according to the indicators read from the medium. In one embodiment of the invention, the individual would use the same indicators or corresponding matching indicators on their fingers to guide them in what key on a musical keyboard instrument to depress, and a plurality of keys would also have the same indicators or corresponding matching indicators on their surfaces to guide an individual in depressing the correct keys in the correct sequence to play music according to the indicators read from the medium. These and other objects and advantages of the invention will become apparent to those skilled in the art from the following detailed description of the invention and the accompanying drawings.

DETAILED DESCRIPTION OF THE PREFERRED EMBODIMENT

The present invention provides a method and system for an individual to read musical notes by reading some indicators (e.g., polygons having individual colors, and/or alphanumerical symbols, or equivalent symbols) on a medium (e.g., paper, plastic, display screen, or an equivalent medium), in order to play a musical keyboard instrument. In one embodiment, a plurality of keys would also have the same indicators or corresponding indicators on their surfaces to guide an individual in depressing the correct keys in the correct sequence to play music according to the indicators read from the medium. In one embodiment, the individual would use the same indicators or corresponding matching indicators on their fingers to guide them in what key on a musical keyboard instrument to depress.

Table 1 lists a small subset of indicators that can be used on the musical score, on the surfaces of some keys of the musical keyboard instrument, and in some embodiments on the fingers.

TABLE 1

A Subset of the Indicator Systems That Can Be Used

Figure 1A:
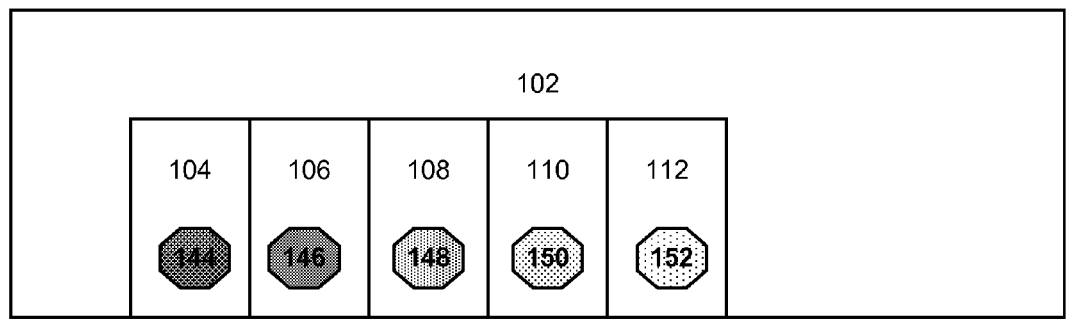
FIG. 1A illustrates a set of keys on a musical keyboard instrument with separate indicators on each key, in accordance with one embodiment of the present invention.
Figure 2A:
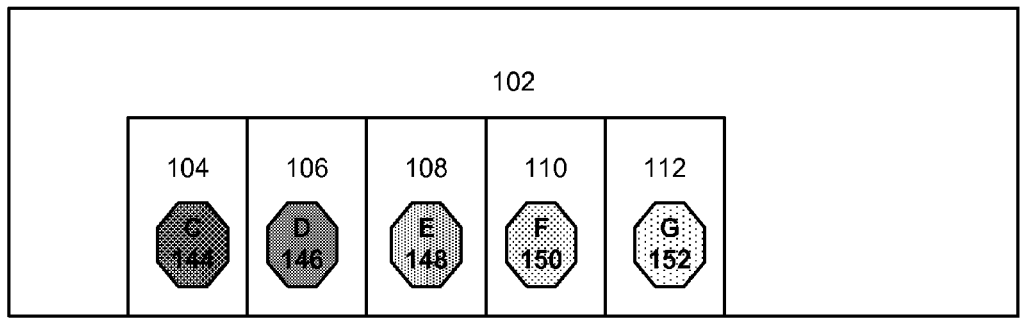
FIG. 2A illustrates a set of keys on a musical keyboard instrument with separate indicators on each key, in accordance with an alternative embodiment of the present invention.
Figure 3A:
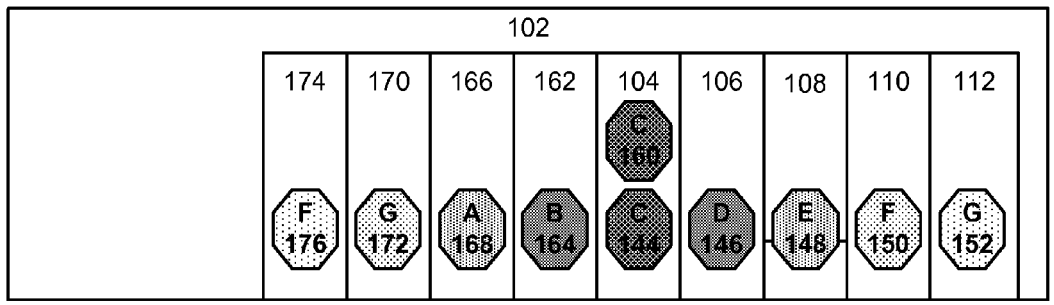
FIG. 3A illustrates a set of keys on a musical keyboard instrument with separate indicators on each key, in accordance with an alternative embodiment of the present invention.
Figure 4A:
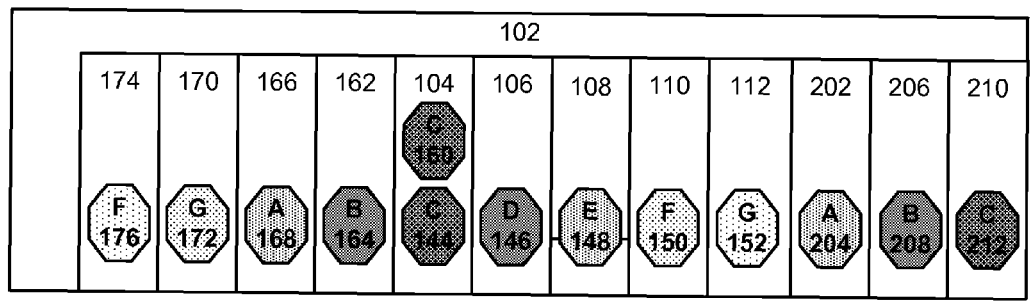
FIG. 4A illustrates a set of keys on a musical keyboard instrument with separate indicators on each key, in accordance with an alternative embodiment of the present invention.
Figures 5A, 5B:
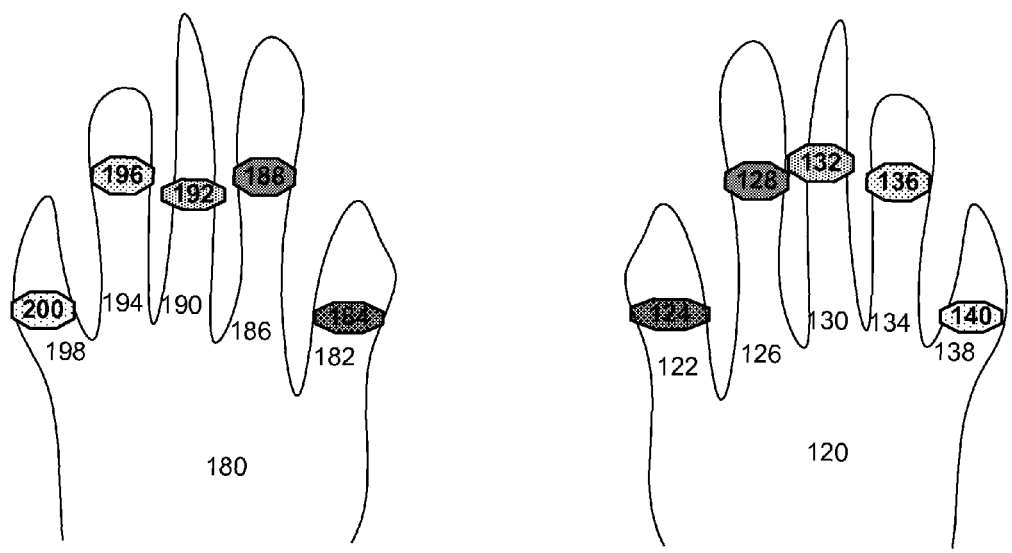
FIG. 5A illustrates a set of keys on a musical keyboard instrument with separate indicators on each key, in accordance with an alternative embodiment of the present invention.
FIG. 5B illustrates a left hand and a right hand with separate indicators on each finger, in accordance with an alternative embodiment of the present invention.

| Indicators | Description for one embodiment |
|---|---|
| Colored polygons | One colored polygon would correspond to one note key on the keyboard of a musical keyboard instrument. For example, a red polygon with or without a matching object on the thumb (e.g., a red-colored ring, string, wire, adhesive sticker, or an equivalent) would represent the "C" note key. FIG. 1A illustrates one embodiment. |
| Colored polygons with alphanumeric letters | One colored polygon with a clearly visible alphanumeric character would correspond to one note key on the keyboard. For example, a "C" or a "1" is superimposed on the red polygon, itself on top of the "C" key of the keyboard. Optionally, there would be a red object (e.g., a polygon) with a "C" or a "1" superimposed on the red object, on the thumb that would represent the "C" note key. FIG. 2A illustrates one embodiment. |
| Colored polygons with stripes | One colored polygon (with either solid color or a striped color) would correspond to one note key on the keyboard. For example, a red polygon with or without a matching object on the thumb (e.g., a red- colored ring, string, wire, adhesive sticker or an equivalent) would represent the "C" note key. Corresponding striped colors would represent the keys for the left hand to play. An example is shown in FIG. 3A. |
| Colors with stripes | One colored polygon (with either solid color or a striped color) would correspond to one note key on the keyboard. For example, a red polygon with or without a matching object on the thumb (e.g., a red-colored ring, string, wire, adhesive sticker or an equivalent) would represent the "C" note key. Corresponding striped colors would represent the keys for the left hand to play. In addition to indicating left hand fingers and keys, striped color polygons would also represent additional keyboard notes. A striped yellow polygon would represent an "A" key, a striped orange polygon would represent a "B" key, and a striped red polygon would represent a "C" key. An example is shown in FIG. 5A. |
| Colors with stripes and with additional alphanumeric characters | One colored polygon (with either solid color or a striped color) would correspond to one note key on the keyboard. For example, a red polygon having a "C" with or without a matching object on the thumb (e.g., a red-colored ring, string, wire, adhesive sticker or an equivalent) would represent the "C" note key. Corresponding striped colors would represent the keys for the left hand to play. In addition to indicating left hand fingers and keys, striped color polygons would also represent additional keyboard notes. A striped yellow polygon with an "A" would represent an "A" key, a striped orange polygon with a "B" would represent a "B" key, and a striped red polygon with a "C" would represent a "C" key. An example is shown in FIG. 4A. |
| Symbols with musical characters | One symbol would correspond to one note key on the keyboard. For example, a colored polygon or a polygon with a "C" superimposed on the polygon on the key surface itself. Additional musical notation would be included on the musical media to indicate additional information. Examples include one dash for one count, two dashes for two counts, three dashes for three counts, the standard musical notation for a rest, other standard musical notation, and so forth. |

The invention provides a method and a system to play music on a musical keyboard instrument by means of reading paper documentation, such as a workbook, or by reading a display of one or more data processing systems (e.g., computer servers, personal computers, laptop computers, and/or handheld devices, such as palm computers, personal digital assistants, personal organizers, cell phones, and so forth), either operating in stand-alone mode or connected in networks (either wired networks or wireless networks). One preferred embodiment of the invention is implemented on a computer network that is connected or coupled to what is commonly referred to as the Internet or the World Wide Web.

In one embodiment, the present invention provides a method and system for an individual to read musical notes on a musical keyboard instrument by reading a plurality of colors on a medium (e.g., paper, plastic, display screen, or an equivalent medium). The individual would use the same colors on their fingers to guide them in what key to depress, and a plurality of keys would also have the same plurality of colors corresponding to each finger.

FIG. 1A illustrates a set of keys on a musical keyboard instrument with separate indicators on each key, in accordance with one embodiment of the present invention. For clarity, only a small set of the total number of keys on the musical keyboard instrument are illustrated. The keyboard 102 has a key 104 with a polygon 144 that represents the "C" key, a key 106 with a polygon 146 that represents the "D" key, a key 108 with a polygon 148 that represents the "E" key, a key 110 with a polygon 150 that represents the "F" key, and a key 112 with a polygon 152 that represents the "G" key. In one embodiment, the polygon 144 would be red, the polygon 146 would be orange, the polygon 148 would be yellow, the polygon 150 would be green, and the polygon 152 would be blue. But the assignment of indicators (e.g., polygons with solid colors) to keys is arbitrary and only needs to be consistent with the indicators of the matching musical notation, and the matching indicators of the fingers of the person.

Figure 1B:
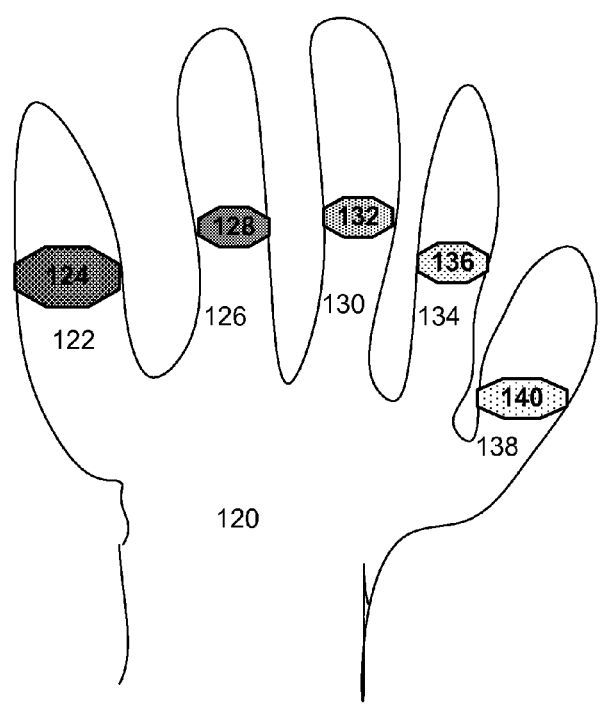
FIG. 1B illustrates a right hand with separate indicators on each finger, in accordance with one embodiment of the present invention.

FIG. 1B illustrates a right hand of a person with separate indicators on each finger, in accordance with one embodiment of the present invention. The corresponding fingers on a right hand 120 would be a thumb 122 with an indicator 124, an index finger 126 with an indicator 128, a middle finger 130 with an indicator 132, an adjacent finger 134 with an indicator 136, and a little finger 138 with an indicator 140. In alternative embodiments, the indicators 124, 128, 132, 136, and 140 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 106, 108, 110, and 112, respectively, as illustrated in FIG. 1A.

FIG. 2A illustrates a set of keys of a musical keyboard instrument with separate indicators on each key, in accordance with an alternative embodiment of the present invention. For clarity, only a small set of the total number of keys on the musical keyboard instrument are illustrated. The keyboard 102 has a key 104 with an indicators (e.g., a colored polygon 144 with a "C") that represents the "C" key, a key 106 with a polygon 146 with a "D" that represents the "D" key, a key 108 with a polygon 148 with an "E" that represents the "E" key, a key 110 with a polygon 150 with an "F" that represents the "F" key, and a key 112 with a polygon 152 with a "G" that represents the "G" key. In one embodiment, the polygon 144 would be red, the polygon 146 would be orange, the polygon 148 would be yellow, the polygon 150 would be green, and the polygon 152 would be blue. But the assignment of polygons with specific colors to specific keys is arbitrary and the actual choice of assignment only needs to be consistent with the matching musical notation, and the matching indicators of the fingers of the person. In another embodiment of the invention, other indicators such as the numbers "1," "2," "3," "4," and "5" would be used instead of alphabetic letters to correspond to the "C" key, the "D" key, the "E" key, the "F" key, and the "G" key, respectively.

Figure 2B:
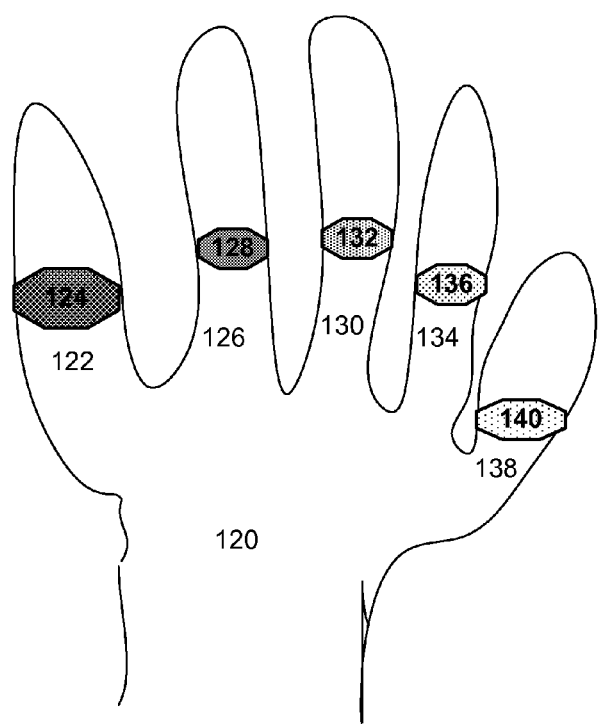
FIG. 2B illustrates a right hand with separate indicators on each finger, in accordance with an alternative embodiment of the present invention.

FIG. 2B illustrates a right hand of a person with separate indicators on each finger, in accordance with an alternative embodiment of the present invention. The corresponding fingers on a right hand 120 would be a thumb 122 with an indicator 124, an index finger 126 with an indicator 128, a middle finger 130 with an indicator 132, an adjacent finger 134 with an indicator 136, and a little finger 138 with an indicator 140. In alternative embodiments, the indicators 124, 128, 132, 136, and 140 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 106, 108, 110, and 112, respectively, as illustrated in FIG. 2A.

FIG. 3A illustrates a set of keys of a musical keyboard instrument with separate indicators on each key, in accordance with an alternative embodiment of the present invention. For clarity, only a small set of the total number of keys on the musical keyboard instrument are illustrated. The keyboard 102 has a key 104 with a polygon 144 that represents the "C" key, a key 106 with a polygon 146 that represents the "D" key, a key 108 with a polygon 148 that represents the "E" key, a key 110 with a polygon 150 that represents the "F" key, and a key 112 with a polygon 152 that represents the "G" key. In addition, in order to indicate keys to be activated by the left hand, key 104 has an additional polygon 160, and there are additional marked keys—key 162 with polygon 164, key 166 with polygon 168, key 170 with polygon 172 and key 174 with polygon 176. In one embodiment, the polygon 160 would be a striped white and red, the polygon 164 would be striped white and orange, the polygon 168 would be striped white and yellow, the polygon 172 would be striped white and green, and the polygon 176 would be striped white and blue. In the embodiment shown in FIG. 3A, each polygon has a letter to indicate the musical note of the key. For example, polygon 164 also has a letter "B," polygon 168 also has a letter "A," polygon 172 also has a letter "G," and polygon 176 also has a letter "F." However, in another embodiment of the invention, these letters would not be included in the polygons, since they are not essential. It should also be noted that the initial assignment of indicators (e.g., polygons with solid colors and striped colors, different shapes of polygons for the right fingers and the left fingers, or an equivalent assignment of indicators) to keys is arbitrary and only needs to be consistent with the indicators of the matching musical notation, and the matching indicators of the fingers of the person.

Figure 3B:
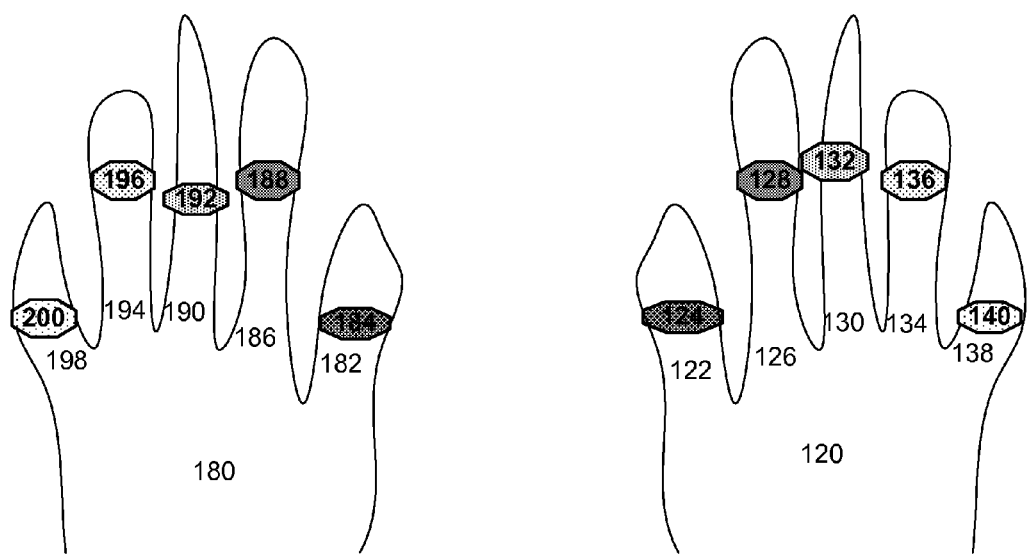
FIG. 3B illustrates a left hand and a right hand with separate indicators on each finger, in accordance with an alternative embodiment of the present invention.

FIG. 3B illustrates a left hand and a right hand of a person with separate indicators on each finger of a person, in accordance with an alternative embodiment of the present invention. The corresponding fingers on a right hand 120 would be a thumb 122 with an indicator 124, an index finger 126 with an indicator 128, a middle finger 130 with an indicator 132, an adjacent finger 134 with an indicator 136, and a little finger 138 with an indicator 140. In alternative embodiments, the indicators 124, 128, 132, 136, and 140 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 106, 108, 110, and 112. The corresponding fingers on a left hand 180 would be a thumb 182 with an indicator 184, an index finger 186 with an indicator 188, a middle finger 190 with an indicator 192, an adjacent finger 194 with an indicator 196, and a little finger 198 with an indicator 200. In alternative embodiments, the indicators 184, 188, 192, 196, and 200 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 162, 166, 170, and 174, respectively, as illustrated in FIG. 3A.

FIG. 4A illustrates a set of keys a musical keyboard instrument with separate indicators on each key, in accordance with an alternative embodiment of the present invention. For clarity, only a small set of the total number of keys on the musical keyboard instrument are illustrated. This embodiment spans 12 keys of the keyboard 102 and also has characters inside the polygons to indicate the actual note played. The keyboard 102 has a key 104 with a polygon 144 that represents the "C" key, a key 106 with a polygon 146 that represents the "D" key, a key 108 with a polygon 148 that represents the "E" key, a key 110 with a polygon 150 that represents the "F" key, and a key 112 with a polygon 152 that represents the "G" key. Additional key 202 has a polygon 204 to indicate it is an "A" key. Additional key 206 has a polygon 208 to indicate it is a "B" key. Additional key 210 has a polygon 212 to indicate it is a "C" key. In addition, key 104 has an additional polygon 160, and there are additional keys—key 162 with polygon 164, key 166 with polygon 168, key 170 with polygon 172 and key 174 with polygon 176. In one embodiment, the polygon 160 would be a striped white and red, the polygon 164 would be striped white and orange, the polygon 168 would be striped white and yellow, the polygon 172 would be striped white and green, and the polygon 176 would be striped white and blue. But the assignment of indicators (e.g., polygons with solid colors and striped colors) to keys is arbitrary and only needs to be consistent with the indicators of the matching musical notation, and the matching indicators of the fingers of the person.

Figure 4B:
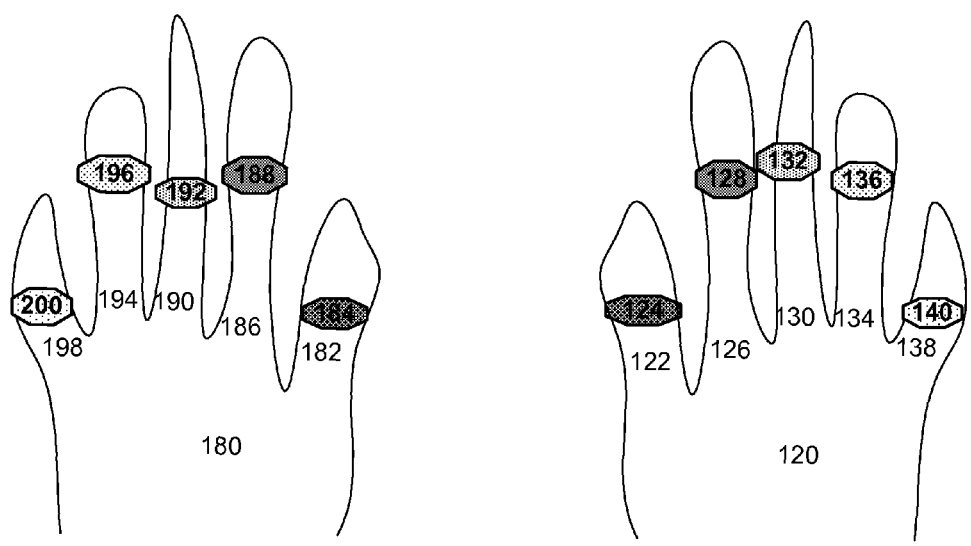
FIG. 4B illustrates a left hand and a right hand with separate indicators on each finger, in accordance with an alternative embodiment of the present invention.

FIG. 4B illustrates a left hand and a right hand with separate indicators on each finger of a person, in accordance with an alternative embodiment of the present invention. The corresponding fingers on a right hand 120 would be a thumb 122 with an indicator 124, an index finger 126 with an indicator 128, a middle finger 130 with an indicator 132, an adjacent finger 134 with an indicator 136, and a little finger 138 with an indicator 140. In alternative embodiments, the indicators 124, 128, 132, 136, and 140 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 106, 108, 110, and 112. The corresponding fingers on a left hand 180 would be a thumb 182 with an indicator 184, an index finger 186 with an indicator 188, a middle finger 190 with an indicator 192, an adjacent finger 194 with an indicator 196, and a little finger 198 with an indicator 200. In alternative embodiments, the indicators 184, 188, 192, 196, and 200 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 162, 166, 170, and 174, respectively, as illustrated in FIG. 4A. The indicators 184, 188, and 192 also correspond to the keys 202, 206, and 210, respectively.

FIG. 5A illustrates a set of keys of a musical keyboard instrument with separate indicators on each key, in accordance with an alternative embodiment of the present invention. For clarity, only a small set of the total number of keys on the musical keyboard instrument are illustrated. There is no actual character inside the polygons in this embodiment. The keyboard 102 has a key 104 with a polygon 144 that represents the "C" key, a key 106 with a polygon 146 that represents the "D" key, a key 108 with a polygon 148 that represents the "E" key, a key 110 with a polygon 150 that represents the "F" key, and a key 112 with a polygon 152 that represents the "G" key. Additional key 202 has a polygon 204 to indicate it is an "A" key. Additional key 206 has a polygon 208 to indicate it is a "B" key. Additional key 210 has a polygon 212 to indicate it is a "C" key. In addition, key 104 has an additional polygon 160, and there are additional keys—key 162 with polygon 164, key 166 with polygon 168, key 170 with polygon 172 and key 174 with polygon 176. In one embodiment, the polygon 160 would be a striped white and red, the polygon 164 would be striped white and orange, the polygon 168 would be striped white and yellow, the polygon 172 would be striped white and green, and the polygon 176 would be striped white and blue. But the assignment of indicators (e.g., polygons with solid colors and striped colors) to keys is arbitrary and only needs to be consistent with the indicators of the matching musical notation, and the matching indicators of the fingers of the person.

FIG. 5B illustrates a left hand and a right hand with separate indicators on each finger, in accordance with an alternative embodiment of the present invention. The corresponding fingers on a right hand 120 would be a thumb 122 with an indicator 124, an index finger 126 with an indicator 128, a middle finger 130 with an indicator 132, an adjacent finger 134 with an indicator 136, and a little finger 138 with an indicator 140. In alternative embodiments, the indicators 124, 128, 132, 136, and 140 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 106, 108, 110, and 112. The corresponding fingers on a left hand 180 would be a thumb 182 with an indicator 184, an index finger 186 with an indicator 188, a middle finger 190 with an indicator 192, an adjacent finger 194 with an indicator 196, and a little finger 198 with an indicator 200. In alternative embodiments, the indicators 184, 188, 192, 196, and 200 would be colored rings, colored wires, colored tapes, colored adhesive polygons, colored adhesive polygons having alphabetic characters, colored adhesive polygons having numbers, or adhesive stickers having alphanumeric characters, or equivalent matching indicators, for the keys 104, 162, 166, 170, and 174, respectively, as illustrated in FIG. 5A. The indicators 184, 188, and 192 also correspond to the keys 202, 206, and 210, respectively.

Figure 6:
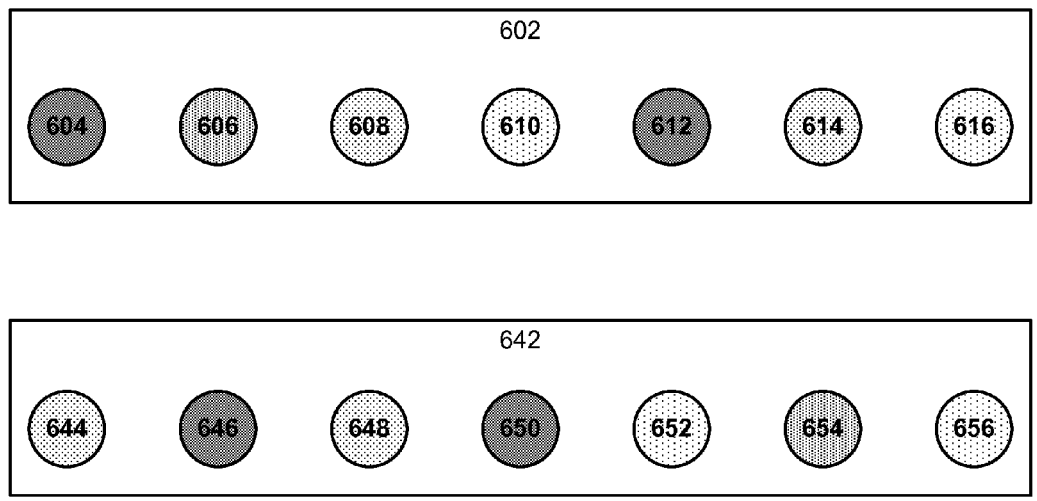
FIG. 6 illustrates a written musical notation, in accordance with one embodiment of the present invention.

FIG. 6 illustrates a written musical notation, in accordance with one embodiment of the present invention. The top row 602 provides a musical notation for the right hand. A melody is incorporated in reading sequential indicators 604, 606, 608, 610, 612, 614, and 616 from left to right, and the melody can be played by the right hand by depressing each key sequentially by the matching finger. The bottom row 642 provides a musical notation for the left hand. A melody is incorporated in reading sequential indicators 644, 646, 648, 650, 652, 654, and 656 from left to right, and the melody can be played by the left hand by depressing each key sequentially by the matching finger of a person.

Figure 7:
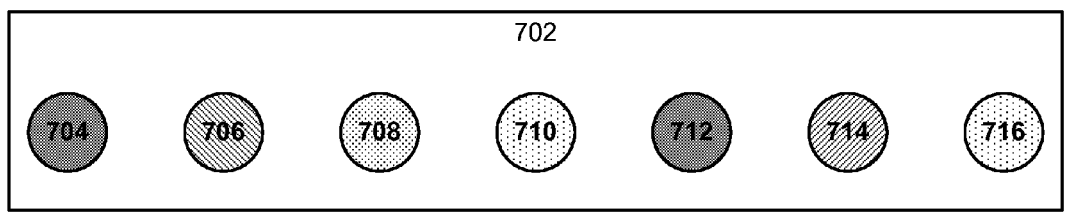
FIG. 7 illustrates a written musical notation, in accordance with an alternative embodiment of the present invention.

FIG. 7 illustrates a written musical notation, in accordance with an alternative embodiment of the present invention. There is only one row 702 and it provides a musical notation for the right hand and the left hand. A melody is incorporated in reading sequential indicators 704, 706, 708, 710, 712, 714, and 716 from left to right, and the melody can be played by the right hand and left hand by activating each key sequentially by the matching finger. As illustrated in this example, indicators 704, 708, 710, 712, and 716 are instructing the activation of corresponding keys by the fingers of the right hand, and indicators 706 and 714 are instructing the activation of corresponding keys by fingers of the left hand. In one embodiment, the keys to be activated by the fingers of the right hand are indicated by solid color polygons, and the keys to be activated by the fingers of the left hand are indicated by striped color polygons. For example, as illustrated in FIG. 3A, the "C" key would have both a solid red polygon for the right hand thumb to activate, and also a striped red polygon for the left hand thumb to activate; and the right side adjacent "D" key would have a solid orange polygon for the right index finger to activate, and the left side adjacent "B" key would have a striped orange polygon for the left index finger to activate.

Figure 8:
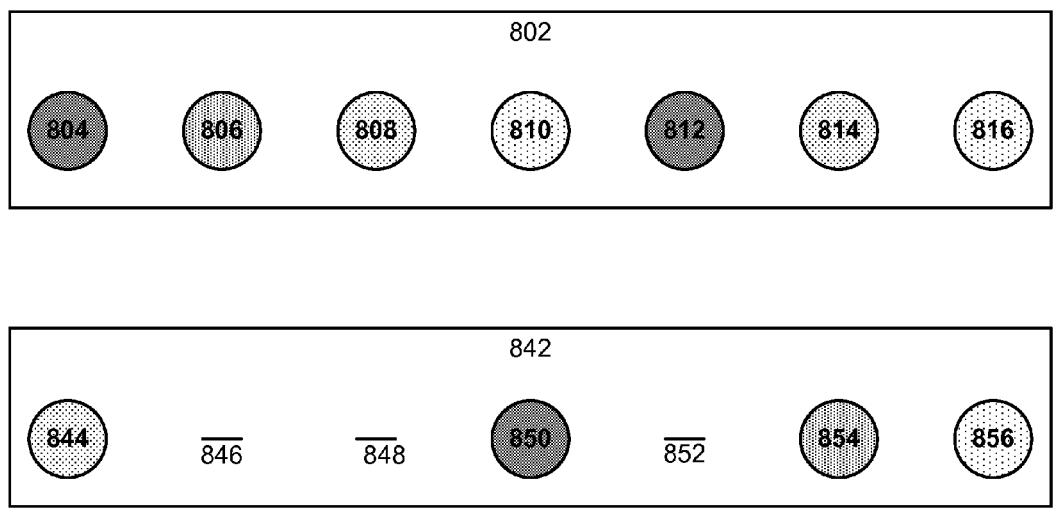
FIG. 8 illustrates a written musical notation, in accordance with an alternative embodiment of the present invention.

FIG. 8 illustrates a written musical notation, in accordance with an alternative embodiment of the present invention. The top row 802 provides a musical notation for the right hand. A melody is incorporated in reading sequential indicators 804, 806, 808, 810, 812, 814, and 816 from left to right, and the melody can be played by the right hand by depressing each key sequentially by the matching finger. The bottom row 842 provides a musical notation for the left hand. A melody is incorporated in reading sequential indicators 844, 846, 848, 850, 852, 854, and 856 from left to right, and the melody can be played by the left hand by depressing each key sequentially by the matching finger. In one embodiment, indicators 846, 848, and 852 are dashes, which represent hold counts instead of keys. In one embodiment, an indicator represents a quarter note. One dash with an indicator represents a half note (i.e., two counts). Two dashes with an indicator represent a dotted half note (i.e., three counts). And three dashes with an indicator represent a whole note (i.e., four counts).

Figure 9:
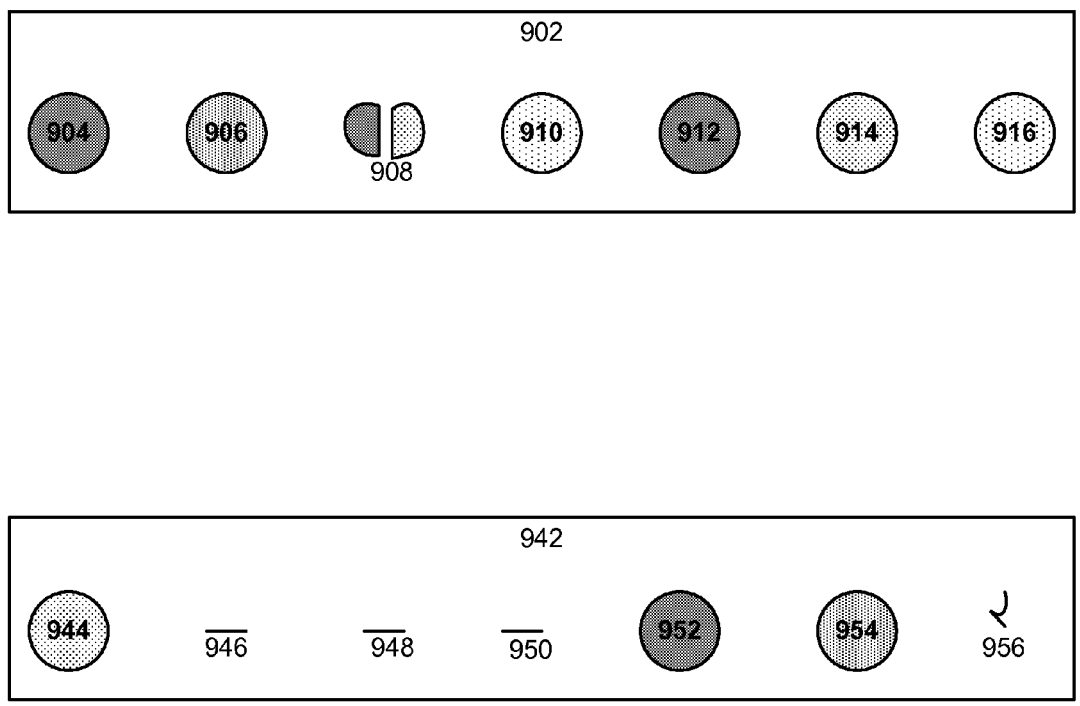
FIG. 9 illustrates a written musical notation, in accordance with an alternative embodiment of the present invention.

FIG. 9 illustrates a written musical notation, in accordance with an alternative embodiment of the present invention. The top row 902 provides a musical notation for the right hand. A melody is incorporated in reading sequential indicators 904, 906, 908, 910, 912, 914, and 916 from left to right, and the melody can be played by the right hand by depressing each key sequentially by the matching finger. The bottom row 942 provides a musical notation for the left hand. A melody is incorporated in reading sequential indicators 944, 946, 948, 950, 952, 954, and 956 from left to right, and the melody can be played by the left hand by depressing each key sequentially by the matching finger. Indicator 908 is a split (cut-in-half) polygon, which indicates two eighth notes. Each half side of the polygon can be a separate color to indicate an eighth note, as used in regular music notation. Indicators 946, 948 and 950 are dashes, which represent holds (counts). Three dashes with an indicator 944 represent a whole note of 4 counts. Indicator 956 represents a rest.

Figure 10:
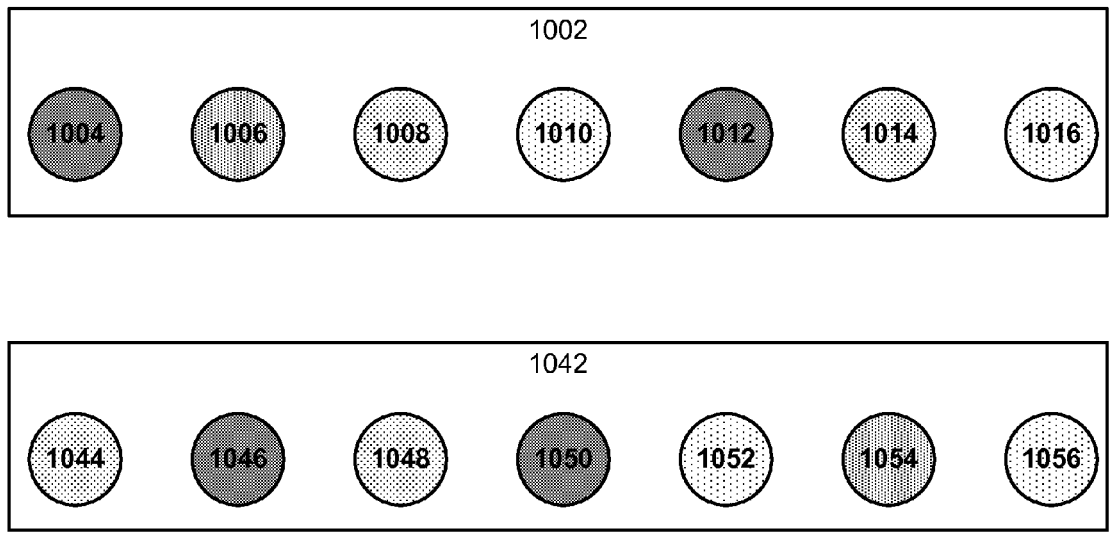
FIG. 10 illustrates a written musical notation, in accordance with an alternative embodiment of the present invention.

FIG. 10 illustrates a written musical notation, in accordance with an alternative embodiment of the present invention. The top row 1002 provides a musical notation for the right hand. A melody is incorporated in reading sequential indicators 1004, 1006, 1008, 1010, 1012, 1014, and 1016 from left to right, and the melody can be played by the right hand by depressing each key sequentially by the matching finger of a person. The bottom row 1042 provides a musical notation for the left hand. A melody is incorporated in reading sequential indicators 1044, 1046, 1048, 1050, 1052, 1054, and 1056 from left to right, and the melody can be played by the left hand by depressing each key sequentially by the matching finger. Various indicators can represent notes, or be conventional musical notation, in order to gradually introduce conventional musical notation step by step as the person learns more advanced concepts and capabilities in playing music on the musical keyboard instrument.

Figure 11:
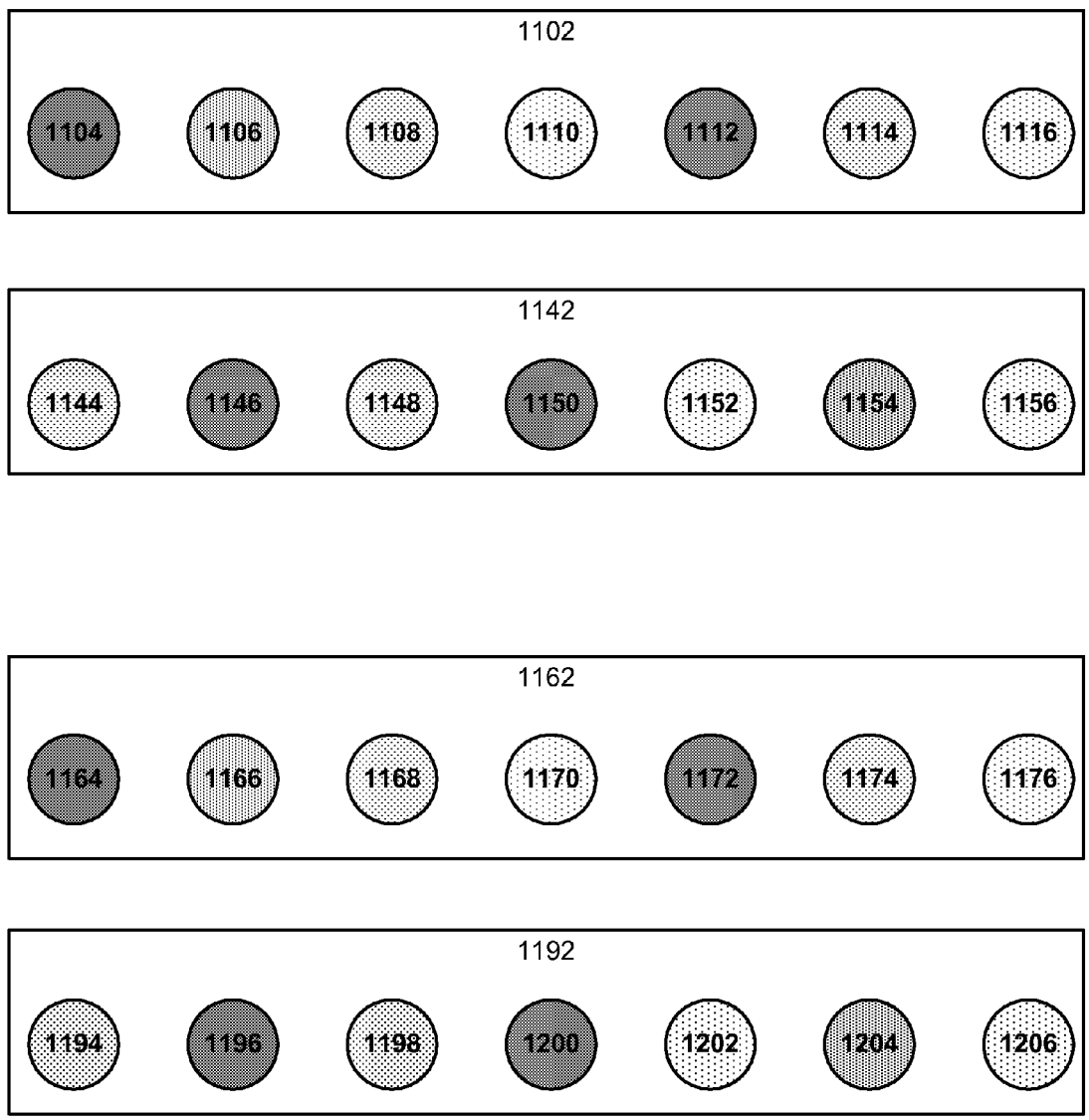
FIG. 11 illustrates a written score of music for a keyboard musical instrument, in accordance with one embodiment of the invention.

FIG. 11 illustrates a written score of music for a keyboard musical instrument, in accordance with one embodiment of the invention. Multiple stanzas (1102 and 1142, 1162 and 1192) of musical notation are illustrated, with the top row of indicators in stanzas 1102 and 1162 indicating the notes to be played by the right hand, and the row of indicators in stanzas 1142 and 1192 immediately underneath the top row indicating the notes to be played by the left hand. Music of any length can be played with enough stanzas of musical notation. It should be noted that in alternative embodiments of the invention, the stanzas can contain more or less notes than illustrated here.

Figure 12:
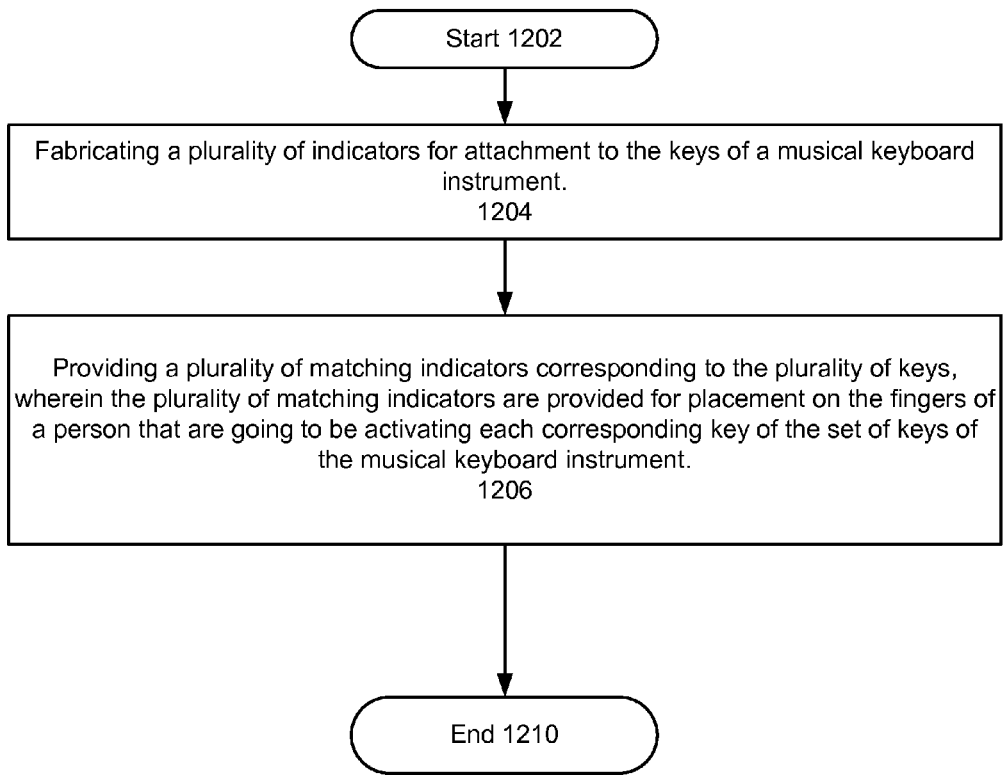
FIG. 12 illustrates a flow chart of a method to play music on a musical keyboard instrument, in accordance with one embodiment of the invention.

FIG. 12 illustrates a flow chart of a method to play music on a musical keyboard instrument, in accordance with one embodiment of the invention. The method begins in operation 1202. The next operation is 1204 which includes fabricating a plurality of indicators for attachment to a set of the keys of the musical keyboard instrument. The next operation is 1206 which includes providing a plurality of matching indicators corresponding to the plurality of keys, wherein the plurality of matching indicators are provided for placement on the fingers of a person that are going to be activating each corresponding key of the set of keys of the musical keyboard instrument. The method ends in operation 1210.

Figure 13:
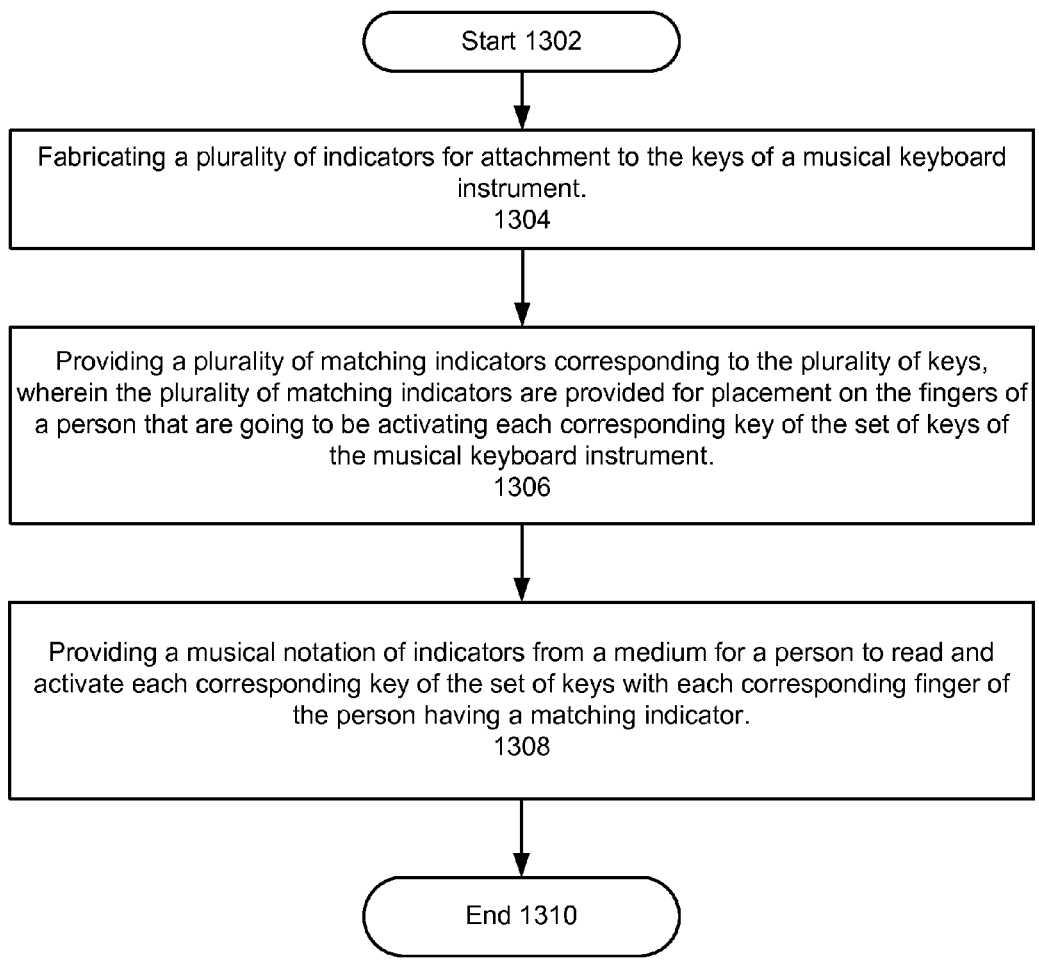
FIG. 13 illustrates a flow chart of a method to play music on a musical keyboard instrument, in accordance with one embodiment of the invention.

FIG. 13 illustrates a flow chart of a method to play music on a musical keyboard instrument, in accordance with one embodiment of the invention. The method begins in operation 1302. The next operation is 1304 which includes fabricating a plurality of indicators for attachment to a set of the keys of the musical keyboard instrument. The next operation is 1306 which includes providing a plurality of matching indicators corresponding to the plurality of keys, wherein the plurality of matching indicators are provided for placement on the fingers of a person that are going to be activating each corresponding key of the set of keys of the musical keyboard instrument. The next operation is 1308 which includes a person reading a musical notation of indicators from a medium and activating each key of the set of keys with each corresponding finger having a matching indicator. The fingers can be on either the right hand or the left hand. The method ends in operation 1310.

Figure 14:
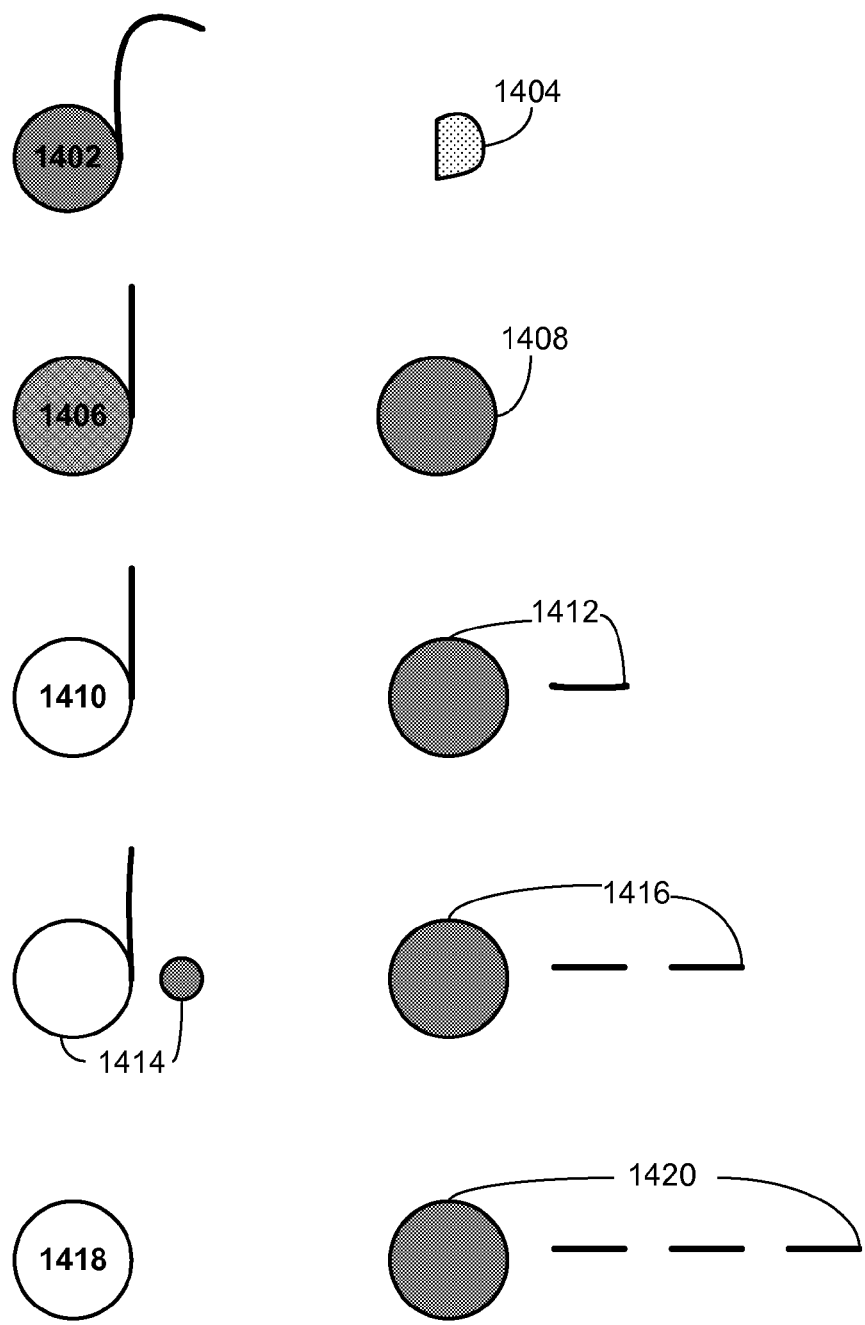
FIG. 14 illustrates a chart of how conventional music notation corresponds to one written musical notation of the invention, in accordance with one embodiment of the invention.

FIG. 14 illustrates a chart of how conventional music notation corresponds to one written musical notation of the invention, in accordance with one embodiment of the invention. Conventional eighth note 1402 is represented by half indicator 1404. Conventional quarter note 1406 is represented by indicator 1408. Conventional half note 1410 is represented by indicator and dash 1412. Conventional dotted half note 1414 is represented by indicator and two dashes 1416. Conventional whole note 1418 is represented by indicator and three dashes 1404.

In one embodiment, the simplest and easiest system to learn would utilize only colors for an individual to read musical notes by reading a plurality of colors, with or without superimposed alphanumerical symbols on a medium (e.g., paper, plastic, display screen, or an equivalent medium). The individual would use the same colors on their fingers to guide them in what key to activate to play a specific note, and a plurality of keys would also have the same plurality of colors corresponding to each finger. In one embodiment of the invention, a learning curve would be provided that would allow the individual to gradually learn more standard musical notation in a step-by-step process of removing the indicators from the keys and removing the indicators from the fingers. Ultimately, the individual would learn how to read standard musical notation.

In one embodiment, the next easiest system to learn would use colors for an individual to read musical notes by reading a plurality of colors, with superimposed alphanumerical symbols on a medium (e.g., paper, plastic, display screen, or an equivalent medium). The individual would use the same colors on their fingers to guide them in what key to depress, and a plurality of keys would also have the same plurality of colors and symbols corresponding to each finger. For example, a red color would have a large "C" superimposed on it to indicate it corresponds to the "C" key of the keyboard musical instrument.

In one embodiment, a different colored wire would be wound around each finger. The sequence of colors chosen can be arbitrary, but it would need to be consistent with the sequence of colors of the written music. In one embodiment, the thumb would have a red wire, the index finger would have an orange wire, the middle finger would have a yellow wire, the next finger would have a green wire, and the little finger would have a blue wire. In one embodiment, the keys on a section of the keyboard starting from the "C" note key would also have the same color as the thumb, the "D" note key would have the same color as the index finger, the "E" note key would also have the same color as the middle finger, the "F" note key would have the same color as the next finger, the "G" note key would also have the same color as the little finger. The colors on the fingers of the right hand would have the same sequence of colors of the fingers of the left hand; the thumbs would have the same color, the little fingers would have the same color, and so forth.

In one embodiment of the invention, the musical notation is preferably recorded on paper and read from paper (e.g., by the individual writing it in a workbook of sheet music and/or reading it from a workbook of sheet music, or an equivalent), or read from a data processing system display as previously recorded on a non-volatile electronically-readable memory, such as a magnetic disk drive, a magneto-optic disk drive, a floppy diskette, a compact disc, or a flash memory. In one embodiment of the invention, the indicators would also include one or more symbols of standard musical notation.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A system to facilitate the learning by a person to play a plurality of musical notes on a musical keyboard instrument, comprising:
   a plurality of indicators on a plurality of keys on a keyboard of a musical keyboard instrument, wherein each key of the plurality of keys has at least one indicator of the plurality of indicators; and
   a plurality of matching indicators corresponding to the plurality of keys, wherein the plurality of matching indicators are provided for placement on a plurality of fingers of a person, wherein each finger of the plurality of fingers has one matching indicator of the plurality of matching indicators that corresponds to a key of the plurality of keys, wherein the person is thereby facilitated in learning to play a plurality of musical notes on the musical keyboard instrument.

2. The system of claim 1, wherein the plurality of indicators on the plurality of keys includes indicators selected from the group of indicators consisting of: colored polygons, colored polygons having numbers, colored polygons having alphabetic characters, colored tapes, and adhesive stickers having alphanumeric characters.

3. The system of claim 1, wherein the plurality of matching indicators on the plurality of fingers includes matching indicators selected from the group of matching indicators consisting of: colored rings, colored wires, colored tapes, colored adhesive polygons, colored adhesive polygons having alphabetic characters, colored adhesive polygons having numbers, and adhesive stickers having alphanumeric characters.

4. The system of claim 1, wherein the plurality of indicators on the plurality of keys includes indicators selected from the group of indicators consisting of: colored polygons, colored polygons having numbers, colored polygons having alphabetic characters, colored tapes, and adhesive stickers having alphanumeric characters, wherein one or more indicators of the plurality of indicators have colors that are not solid.

5. The system of claim 1, further comprising a medium having a musical notation readable by the person, wherein the musical notation is comprised of a set of indicators chosen from the plurality of indicators on the plurality of keys of the keyboard of a musical keyboard instrument.

6. The system of claim 5, wherein the musical notation is read by a person from a medium selected from the group of media consisting of: a paper sheet, a workbook, a display of a computer server, a display of a personal computer, a display of a laptop computer, a display of a palm computer, a display of a personal digital assistant, a display of a personal organizer, and a display of a cell phone.

7. The system of claim 5, further comprising a medium having a musical notation readable by the person, wherein the musical notation is comprised of one line of a set of indicators for the fingers of the right hand of the person and a second line of a set of indicators for the fingers of the left hand of the person.

8. The system of claim 5, further comprising a medium having a musical notation readable by the person, wherein the musical notation is comprised of one line of a set of indicators for the fingers of both the right hand of the person and the left hand of the person.

9. The system of claim 5, further comprising a medium having a musical notation readable by the person, wherein the musical notation indicates more than five notes, and wherein the musical notation is comprised of one line of a set of indicators for the fingers of the right hand of the person and a second line of a second set of indicators for the fingers of the left hand of the person.

10. The system of claim 5, further comprising a medium having a musical notation readable by the person, wherein the musical notation indicates more than five notes and one or more standard musical indicators, and wherein the musical notation is comprised of one line of a set of indicators for the fingers of the right hand of the person and a second line of a second set of indicators for the fingers of the left hand of the person.

11. A method to facilitate the learning by a person to play a plurality of musical notes on a musical keyboard instrument, comprising:
fabricating a plurality of indicators for attachment on a plurality of keys on a keyboard of a musical keyboard instrument, wherein each key of the plurality of keys has at least one indicator of the plurality of indicators; and
providing a plurality of matching indicators corresponding to the plurality of keys, wherein the plurality of matching indicators are provided for placement on a plurality of fingers of a person, wherein each finger of the plurality of fingers has one matching indicator of the plurality of matching indicators that corresponds to a key of the plurality of keys, wherein the person is thereby facilitated in learning to play a plurality of musical notes on the musical keyboard instrument.

12. The method of claim 11, wherein the plurality of indicators on the plurality of keys includes indicators selected from the group of indicators consisting of: colored polygons, colored polygons having numbers, colored polygons having alphabetic characters, colored tapes, and adhesive stickers having alphanumeric characters.

13. The method of claim 11, wherein the plurality of matching indicators on the plurality of fingers includes matching indicators selected from the group of matching indicators consisting of: colored rings, colored wires, colored tapes, colored adhesive polygons, colored adhesive polygons having alphabetic characters, colored adhesive polygons having numbers, and adhesive stickers having alphanumeric characters.

14. The method of claim 11, wherein the plurality of indicators on the plurality of keys includes indicators selected from the group of indicators consisting of: colored polygons, colored polygons having numbers, colored polygons having alphabetic characters, colored tapes, and adhesive stickers having alphanumeric characters, wherein one or more indicators of the plurality of indicators have colors that are not solid.

15. The method of claim 11, further comprising:
providing a medium having a musical notation readable by the person, wherein the musical notation is comprised of a set of indicators chosen from the plurality of indicators on the plurality of keys of the keyboard of a musical keyboard instrument.

16. The method of claim 15, wherein the musical notation is read by a person from a medium selected from the group of media consisting of: a paper sheet, a workbook, a display of a computer server, a display of a personal computer, a display of a laptop computer, a display of a palm computer, a display of a personal digital assistant, a display of a personal organizer, and a display of a cell phone.

17. The method of claim 15, further comprising:
providing a medium having a musical notation readable by the person, wherein the musical notation is comprised of one line of a set of indicators for a plurality of fingers of the right hand of the person and a second line of a set of indicators for a plurality of fingers of the left hand of the person.

18. The method of claim 15, further comprising:
providing a medium having a musical notation readable by the person, wherein the musical notation is comprised of one line of a set of indicators for a plurality of fingers of both the right hand of the person and the left hand of the person.

19. The method of claim 15, further comprising:
providing a medium having a musical notation readable by the person, wherein the musical notation indicates more than five notes, and wherein the musical notation is comprised of one line of a set of indicators for a plurality of fingers of the right hand of the person and a second line of a second set of indicators for a plurality of fingers of the left hand of the person.

20. A method to facilitate the learning by a person to play a plurality of musical notes on a musical keyboard instrument, comprising:
fabricating a plurality of indicators for attachment on a plurality of keys on a keyboard of a musical keyboard instrument, wherein each key of the plurality of keys has at least one indicator of the plurality of indicators; and
providing a medium having a musical notation readable by a person, wherein the musical notation is comprised of a set of indicators chosen from the plurality of indicators on the plurality of keys of the keyboard of the musical keyboard instrument, wherein the person is thereby facilitated in learning to play a plurality of musical notes on the musical keyboard instrument.

* * * * *